(12) United States Patent
Majewski et al.

(10) Patent No.: US 11,205,027 B2
(45) Date of Patent: Dec. 21, 2021

(54) EQUIPMENT FAULT DETECTION, DIAGNOSTICS AND DISAGGREGATION SYSTEM

(71) Applicant: Honeywell International Inc., Morris Plains, NJ (US)

(72) Inventors: Joseph Majewski, Strongsville, OH (US); Radek Fisera, Morris Plains, NJ (US); Mark Anglin, Wadsworth, OH (US); Thomas Gall, Solon, OH (US)

(73) Assignee: Honeywell International Inc., Charlotte, NC (US)

( * ) Notice: Subject to any disclaimer, the term of this patent is extended or adjusted under 35 U.S.C. 154(b) by 621 days.

(21) Appl. No.: 16/134,327

(22) Filed: Sep. 18, 2018

(65) Prior Publication Data

US 2019/0102492 A1   Apr. 4, 2019

Related U.S. Application Data

(63) Continuation of application No. 13/715,511, filed on Dec. 14, 2012, now Pat. No. 10,083,255.

(51) Int. Cl.
*G06F 30/20* (2020.01)
*F24F 1/0035* (2019.01)
*F24F 3/00* (2006.01)
*G06F 30/367* (2020.01)
*G01H 1/00* (2006.01)
(Continued)

(52) U.S. Cl.
CPC ............ *G06F 30/20* (2020.01); *F24F 1/0035* (2019.02); *F24F 3/001* (2013.01); *G06F 30/367* (2020.01); *F24F 11/32* (2018.01); *F24F 2221/16* (2013.01); *G01H 1/00* (2013.01); *G06F 2119/06* (2020.01)

(58) Field of Classification Search
None
See application file for complete search history.

(56) References Cited

U.S. PATENT DOCUMENTS 6,366,889 B1   4/2002   Zaloom
7,421,378 B2   9/2008   Pernestal
7,885,917 B2   2/2011   Kuhns et al.
(Continued)

FOREIGN PATENT DOCUMENTS

WO   2011028889   3/2011

OTHER PUBLICATIONS

Hart, G.W. 1992. "Nonintrusive Appliance Load Monitoring," Proceedings of the IEEE, vol. 80, No. 12, pp. 1870-1891 (Year: 1992).*
(Continued)

*Primary Examiner* — Kamini S Shah
*Assistant Examiner* — Russ Guill
(74) *Attorney, Agent, or Firm* — Seager, Tufte & Wickhem LLP

(57) ABSTRACT

A system for fault detection and diagnostics of equipment. The system may also be capable of disaggregation and/or virtual submetering of energy consumption by equipment, such as that of heating, ventilation and air conditioning, lighting, and so forth, in a building. Vibration and current sensors, along with one or more algorithms, may be utilized for fault detection and diagnostics of equipment. Models may be developed to aid in deducing energy consumption of individual components of equipment, and the like, for a building.

18 Claims, 14 Drawing Sheets

(51) Int. Cl.
*F24F 11/32* (2018.01)
*G06F 119/06* (2020.01)

(56) References Cited

U.S. PATENT DOCUMENTS

| | | | |
|---|---|---|---|
| 8,340,831 B2* | 12/2012 | Benitez | G06Q 10/04 |
| | | | 700/291 |
| 10,712,723 B2* | 7/2020 | Haghighat-Kashani | |
| | | | G06Q 30/02 |
| 2002/0138217 A1 | 9/2002 | Shen et al. | |
| 2004/0046454 A1 | 3/2004 | Kang | |
| 2004/0227520 A1* | 11/2004 | Saunders | G01R 31/34 |
| | | | 324/511 |
| 2005/0096873 A1 | 5/2005 | Klein | |
| 2007/0067678 A1* | 3/2007 | Hosek | G06F 11/008 |
| | | | 714/25 |
| 2009/0292505 A1 | 11/2009 | Van Dyke et al. | |
| 2010/0060289 A1 | 3/2010 | Wiedenbrug et al. | |
| 2010/0076615 A1 | 3/2010 | Daniel et al. | |
| 2010/0169030 A1 | 7/2010 | Parlos | |
| 2011/0112780 A1 | 5/2011 | Moss | |
| 2011/0209487 A1 | 9/2011 | Tachiki et al. | |
| 2011/0213739 A1* | 9/2011 | Benitez | G01D 4/004 |
| | | | 706/12 |
| 2011/0302125 A1 | 12/2011 | Shetty et al. | |
| 2012/0022700 A1 | 1/2012 | Drees et al. | |
| 2012/0065783 A1 | 3/2012 | Fadell et al. | |
| 2012/0068692 A1* | 3/2012 | Patel | G01R 15/202 |
| | | | 324/202 |
| 2012/0072029 A1 | 3/2012 | Persaud et al. | |
| 2016/0012147 A1* | 1/2016 | Benjamin | G06F 16/986 |
| | | | 715/234 |

OTHER PUBLICATIONS

Jack Kelly et al., "Disaggregating multi-state appliances from smart meter data," 2012, Sigmetrics 2012, two pages (Year: 2012).*

Ahmed Zoha et al., "Non-intrusive load monitoring approaches for disaggregated energy sensing: a survey," 2012, Sensors, vol. 12, pp. 16838-16866 (Year: 2012).*

S.R. Shaw et al., "Detection and diagnosis of HVAC faults via electrical load monitoring," 2002, HVAC&R Research, vol. 8, No. 1, 28 pages (Year: 2002).*

"A Novel, Low-Cost, Reduced-Sensor Approach for Providing Smart Remote Monitoring and Diagnostics for Packaged Air Conditioners and Heat Pumps," U.S. Department of Energy, PPNL-18891, 18 pages, Sep. 2009.

Chao, "Fault Detection and Diagnosis of Electro-Mechanical Systems Based on Real-Time Data," Master's Thesis, University of Cincinnati, 96 pages, May 16, 2008.

* cited by examiner

US 11,205,027 B2

EQUIPMENT FAULT DETECTION, DIAGNOSTICS AND DISAGGREGATION SYSTEM

This present application is a continuation of U.S. patent application Ser. No. 13/715,511, filed Dec. 14, 2012, and entitled "An Equipment Fault Detection, Diagnostics and Disaggregation System". U.S. patent application Ser. No. 13/715,511, filed Dec. 14, 2012, is hereby incorporated by reference.

BACKGROUND

The present disclosure pertains to energy consumption of equipment in buildings, and particularly to such consumption in commercial buildings.

SUMMARY

The disclosure reveals a system for fault detection and diagnostics of equipment. The system may also be capable of disaggregation and/or virtual submetering of energy consumption by equipment, such as that of heating, ventilation and air conditioning, lighting, and so forth, in a building. Vibration and current sensors, along with one or more algorithms, may be utilized for fault detection and diagnostics of equipment. Models may be developed to aid in deducing energy consumption of individual components of equipment, and the like, for a building.

DESCRIPTION

The present system and approach, as described herein and/or shown in the Figures, may incorporate one or more processors, computers, controllers, user interfaces, wireless and/or wire connections, and/or the like, wherever desired.

State of the art fault detection and diagnostic (FDD) and efficiency monitoring algorithms for heating, ventilation and air conditioning (HVAC) equipment such as packaged rooftop units (RTUs) (FIG. 1) may typically rely on measurements of key operating parameters of the equipment and its surrounding environment. Operating parameters may incorporate supply and return air temperatures, outside air temperature, humidity, control signals, operating schedules and energy consumption of the equipment. Many FDD and efficiency monitoring algorithms may employ mathematical models of the energy consumption of the equipment for a given set of operating parameters. The algorithms may use differences in actual consumption of the equipment versus the model-predicted consumption to highlight potential issues with the equipment or with longer term data sets to derive a performance degradation trend for the equipment.

Figure 1:
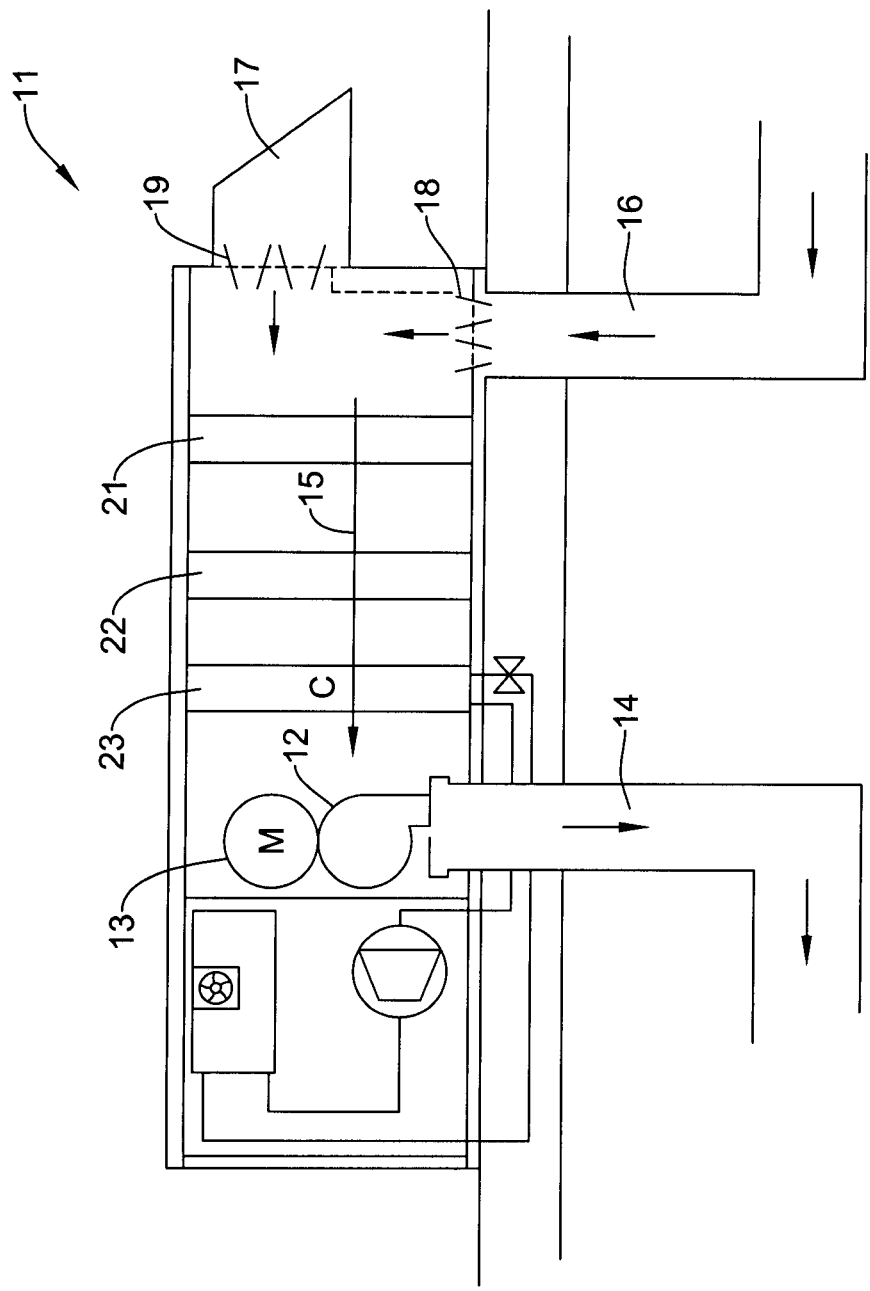
FIG. 1 is a diagram of a rooftop heating, ventilation and air conditioning unit.

FIG. 1 is a diagram of a rooftop HVAC unit (RTU) 11. A fan 12 driven by a motor 13 may provide supply air to one or more spaces of a building through a supply air duct 14. Air 15 may be drawn in from a return air duct 16 and an outdoor air duct 17 past dampers 18 and 19, respectively, through a filer 21, an electric/hot gas heating coil 22 and evaporator cooling component 23 to fan 12. Damper 19 may operated as part of an economizer. Other components may be part of the cooling component and heating coil.

Several factors limit the application and usefulness of FDD and efficiency monitoring algorithms to existing deployed HVAC systems, which may incorporate the following factors: 1) Sparse instrumentation of RTU operating and environmental parameters due to cost reasons; 2) Lack of available accurate measurement of energy consumption for the individual RTU and its component electrical loads; 3) Availability of short interval readings for operating parameters; and 4) Long lag times between initial readings of data and availability of the data to fault detection and efficiency monitoring algorithms.

With respect to factor 1), algorithms may be developed to work with a minimum defined subset of operating and environmental parameters commonly available in HVAC building management systems. However, significantly richer fault detection/diagnostics and efficiency monitoring algorithms might be provided with the addition of certain sensor types, i.e., certain vibration sensors not typically available in commercial off the shelf installations.

With respect to factor 2), in most cases energy consumption measurement of some kind may be needed for meaningful results. At a minimum, the entire power consumption of the RTU should be measured. Measurement of all electrical loads within the RTU may appear as the ideal scenario. In systems where electrical meters have been installed on the power feeds of RTUs, typically no further finer granularity measurement may necessarily be available for the individual electrical loads within the RTU. Each RTU may contain a blower motor for driving the supply air fan, two or more compressors for the cooling portion of the RTU, one or two condenser fans for the cooling portion and optionally a resistive electric heating coil for the heating portion of the RTU. With only the entire consumption of the RTU measured, the algorithms for FDD and efficiency monitoring cannot necessarily provide a fine grained and accurate mathematical model of the energy consumption because of the different processes contributing to the electrical load. Typical refrigeration system algorithms such as compressor efficiency monitoring, condenser efficiency monitoring, and the like, cannot necessarily be accurately performed without knowledge of specific energy consumption of the compressors and condenser fans. Installation of current sensors or electrical submeters on the individual electrical loads within an RTU may be prohibitively complex and expensive especially for fielded systems. For accurate and effective HVAC fault detection/diagnostics and efficiency monitoring, it may be necessary to have some means of energy consumption measurement for an RTU, but the number of actual measuring devices employed should be minimized to reduce cost and complexity.

With respect to factors 3) and 4), FDD and efficiency monitoring algorithms may often be performed at several levels of indirection away from the RTU. This may result in a significant time lag for data gathering and limit data sampling frequency. Early detection of faults is not necessarily possible and algorithm fidelity may be compromised. A typical multi-site retail HVAC deployment for a large customer might consist of thousands of buildings each with twenty or more RTUs. Each building may be served by an onsite building management system (BMS).

Figure 2:
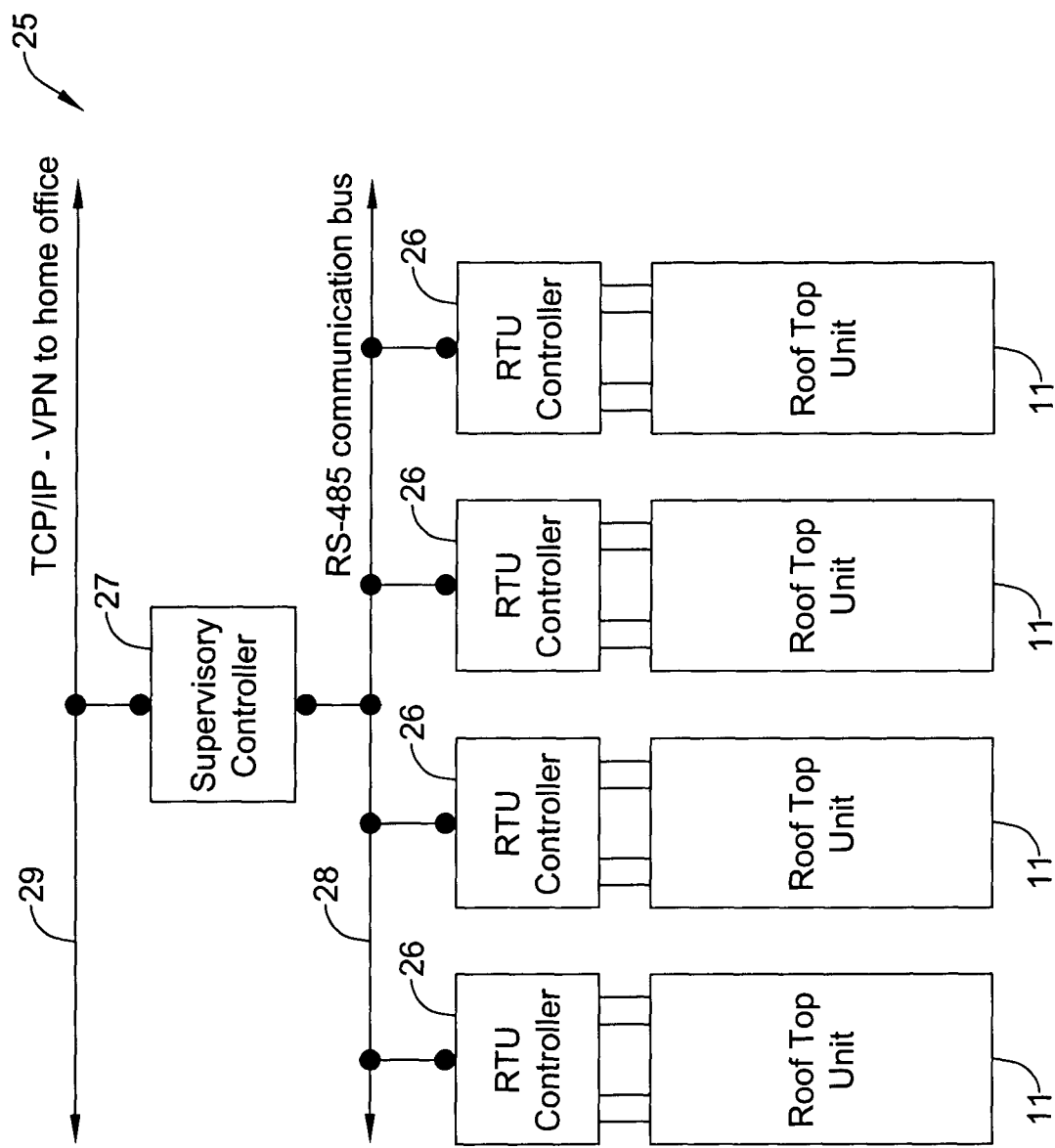
FIG. 2 is a diagram of example architecture for an onsite building management system.

FIG. 2 is a diagram of an example of system architecture 25 for the onsite building management system (BMS). A BMS may control RTUs 11 usually by means of a dedicated embedded controller 26 for each RTU 11 that is networked to a site level supervisory controller 27. Controllers 26 may be connected to an RS-485 communications bus 28. Supervisory controller 27 may have a connection with a home office via a TCP/IP-VPN (transmission control protocol/internet protocol-virtual private network) connection 29. Operating parameters such as temperatures and control signals may be collected from the embedded controllers 26 and sent to supervisory controller 27. Other parameters may be directly provided by supervisory controller 27. Operating parameters are often stored as time series data in historical logs within the supervisory controller 27. Storage space may be at a premium therefore sampling intervals are generally 15 minutes or greater. Historical logs of the operating parameters may often be sent at regular intervals perhaps once daily or once weekly from each site supervisory controller 27 to a home office location where they are placed into a data warehouse or similar relational database server. In retrofit situations, the central home office may often be the deployment location for fault detection algorithms because of the difficulty of modifying legacy BMS systems. Many FDD algorithms may require 10 minute or even 1 minute sampling rates for optimal effectiveness. It may also be desirable to have the ability to detect equipment faults as early as possible. With lag times measured in days from original source to home office, this does not necessarily seem feasible. In general, it may be desirable to have FDD and efficiency monitoring algorithms deployed architecturally nearby to the equipment that it is monitoring for timeliness of fault detection and fidelity of algorithms.

The present system may address factors 1)-4) above to provide a cost effective and easy to install appliances for advanced fault detection/diagnosis/efficiency monitoring of packaged roof top units.

Figure 3:
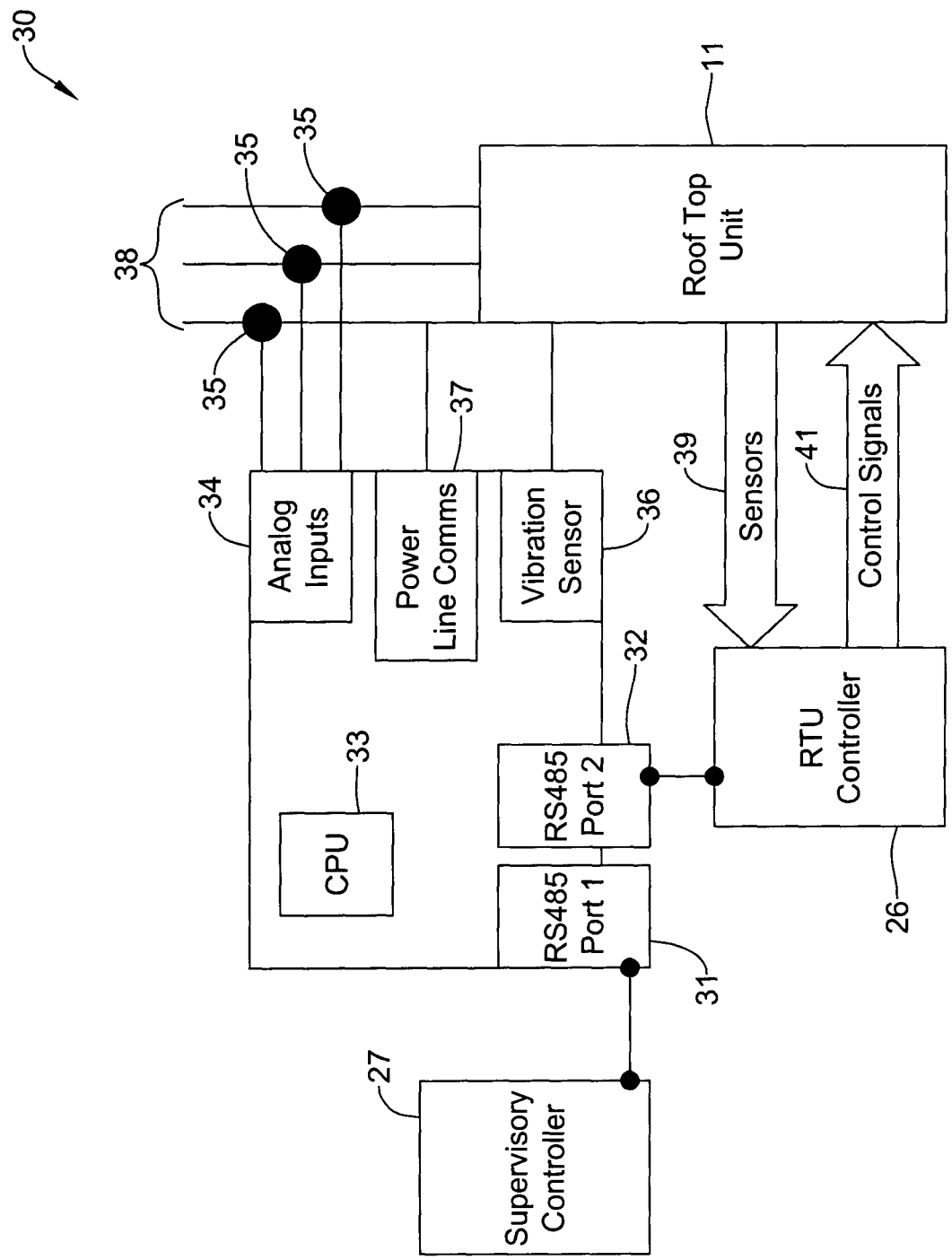
FIG. 3 is a block diagram of a special purpose embedded computing system with associated software functions.

FIG. 3 is a high-level block diagram 30 of a special purpose embedded computing system with associated software functions of the present system. Supervisory controller 27 may be a centralized controller employed for occupancy scheduling, data collection, alarm collection and global data inputs, i.e., outside air temperature, humidity, and so forth.

Supervisory controller 27 may be connected to RTU controllers 26 with RS-485 communications bus 28. For instance, controller 27 may connected to controllers 26 via RS-485 port 31, computer (CPU) 33 and RS-485 port 32, Several different protocols may be used but the most common protocols in retail HVAC such as Novarnet™, BACnet™ MS/TP and Modbus™ tend to use an RS-485 physical layer with asynchronous character-based data transmission. Even though the RS-485 layer may be used, Lonworks or other bus types may be used. Supervisory controller 27 may usually be a bus master in RS-485 protocols and as such may initiate communication exchanges.

CPU 33 may be a reasonably priced 32-bit microcontroller preferably with on-die support for serial ports and analog inputs. Possible CPU candidates may incorporate the Atmel™ 4S series or Freescale™ i.MX series. An embedded real time operating system may also be employed for providing multithreading and other beneficial software functions.

Analog inputs 34 to CPU 33 may have analog-to-digital conversion channels that may be employed for converting raw output of current sensors 35 into a digital format. Inputs 34 may be provided within CPU 33 for cost reasons. Analog inputs 34 may also be used for interfacing with a vibration sensor 36.

Power line comms 37 may be a powerline communication (PLC) chipset employed to communicate with external systems for results reporting. Power line comms 36 may be connected to one or more of the lines of a three phase power feed 38. As the present system may be intended for retrofitting into existing rooftop unit installations, it may not be necessarily desirable to require an additional communications mechanism to be installed. Powerline communications may therefore be employed using one of the power phases of three phase power feed 38 to RTU 11. The present system may need a communications channel to communicate results of fault detection and efficiency monitoring algorithms and for commissioning/parameter setup of a device. Such communication may be realized either with PLC or with RS485 port 31. Usage of an RS485 channel may need protocol support in supervisory controller 27 to be added; thus, PLC may be used for retrofit installations. The present system may use an industry standard powerline communications protocol such as a G3-PLC or equivalent.

Vibration sensor 36 may be a reasonably priced triaxial accelerometer with an I2C digital interface. Sensor 36 may be used to enable vibration analysis to be performed. Certain types of equipment degradation and malfunction may be characterized by changes in vibration patterns. Vibration sensor data may be used to support fault detection algorithms based on vibration analysis.

RTU controller 26 may be a dedicated embedded computing device for accomplishing digital staged heating and cooling control of single packaged rooftop HVAC unit 11. A Novar™ electronic thermostat module (ETM) family controller may be used. A Novar ETM-2051, for example, may be commonly sold as a default factory accessory in certain commercial Lennox™ rooftop package units.

A commercial roof-mounted HVAC device 11 consisting of the vapor cycle compression cooling section 23, the gas or electric heating unit 33, blower motor 13 and fan 12 for air circulation, damper 19 for modulating outside air percentage and associated air filter or filters 21, as shown in FIG. 1.

Non-invasive clamp-on current sensors 35 may be used to measure current draw on the three power phase feed 38 to RTU 11. Clamp-on sensors 35 may typically be more expensive than other current sensing devices because of their ease of installation in retrofits; however, lower cost current sensors may be used. Current sensor data may be collected by CPU 33 via its analog-to-digital conversion channels of inputs 34. RTU controller 26 may receive data from sensors at RTU 11 along conveyance 39. RTU controller 26 may provide control signals along conveyance 41 to RTU 11.

Figure 4:
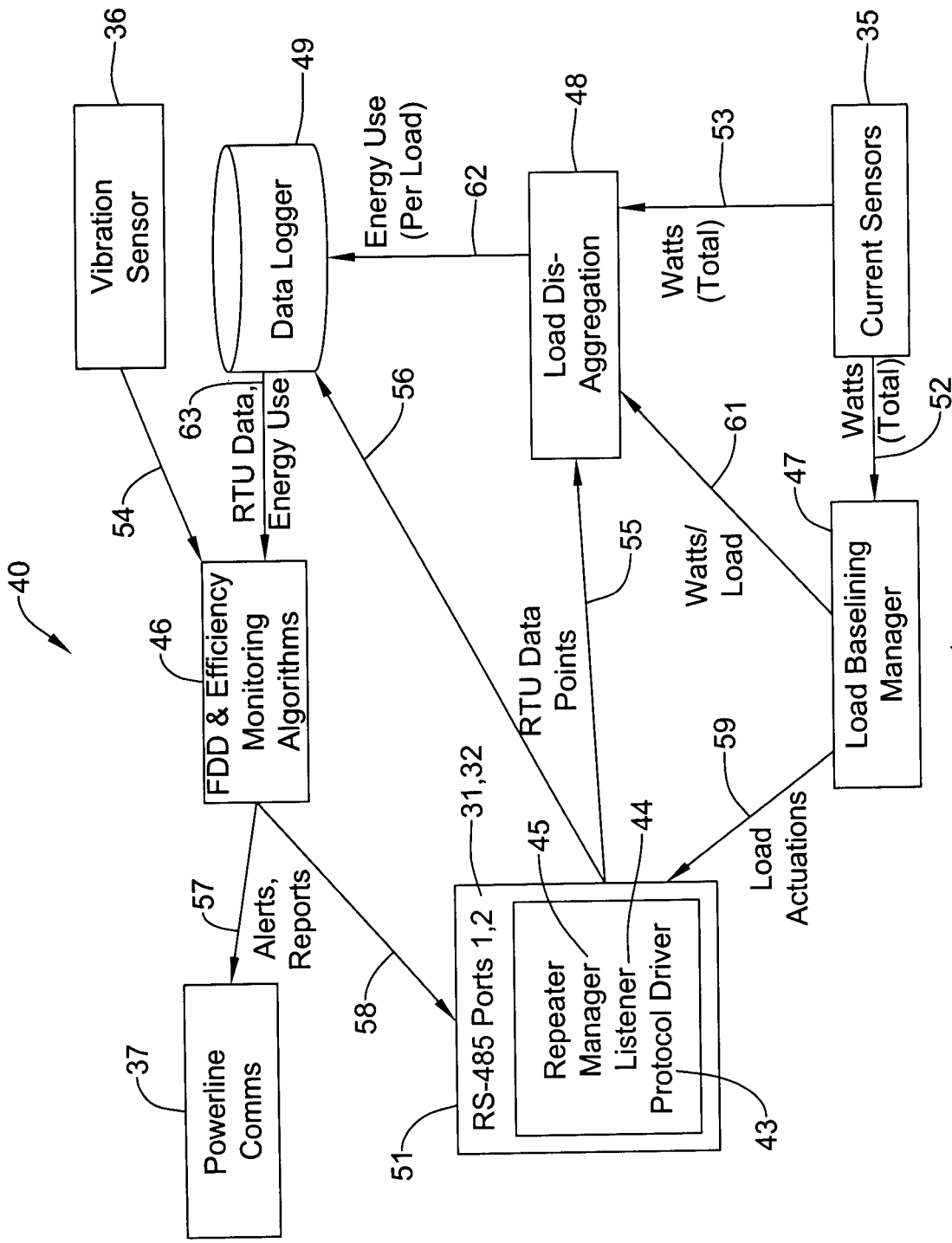
FIG. 4 is a diagram of a software or application level perspective of a disaggregation system.

FIG. 4 is a diagram of a software or application level perspective 40 of the present system. A symbol 51 may represent containing at least RS-485 ports 31 and 32, a protocol driver 43, listener 44, repeat manager 45. Protocol driver 43 may contain a software driver for a building management system protocol used on the RS-485 communication bus 28 (FIG. 2). For the present system with a Novar Opus™ or LogicOne™ BMS, this may be a driver for the Novarnet™ protocol.

A listener 44 may be a software module that intercepts packets from RTU controller 26 and supervisory controller 27 in order to gather data points from each one. Module 44 may be used to obtain sensor readings from RTU controller 26 and global system values from supervisory controller 27 such as outside temperature, humidity, and so forth.

A repeater manager 45 may be a software module that controls the information flow on RS-485 ports 31 and 32. The present system may employ RS-485 ports 31 and 32 to allow it to circumvent normal protocol operations when it needs to conduct private operations, i.e., load baselining with RTU controller 26. Port 31 may be wired to supervisory controller 27 and port 32 may be wired to RTU controller 26. During normal operations, messages from supervisory controller 27 may be received on port 31 and repeated by the system on port 32 unperturbed. Likewise, responses from RTU controller 26 may be received on port 32 and be repeated up to supervisory controller 27. When the present system conducts load electrical load baseline measurements, the system may communicate directly with RTU controller 26 on port 32 and mimic the normal communications responses of an RTU controller back to supervisory controller 27 on port 31 so that spurious alarms are not necessarily caused in the BMS system.

FDD and efficiency monitoring algorithms 46 may be a collection of software algorithms used to detect equipment faults and operation inefficiencies in the heating, cooling and mechanical subsystems of RTU 11. In the present system, a variety of algorithms based on mathematical models of predicted energy consumption may be employed. The algorithms may determine the ideal energy consumption for the current environmental conditions and control setpoints based on past historical measurements and compare the measured energy consumption to this. Algorithms may be deployed for compressor fault detection, condenser fault detection, compressor refrigerant liquid slugging, overall control efficiency, performance degradation over time, mechanical fault detection, i.e., slipping belts and other common RTU faults. In addition to the energy model-based algorithms, other algorithms based on vibration analysis may be employed for detection of mechanical faults such as bearing wear. The present system may also provide a means for sending alerts and reports to an external entity for indicating the results of FDD and efficiency monitoring algorithms 46. A provision may be made for allowing relevant parameters of the algorithms to be configured remotely over either the RS-485 bus 28 or powerline comms 37.

An aspect of the present system is an ability to deduce the energy consumption of the individual compressor motors, heating coil and blower motor from a single measured current draw. A load baselining manager 47 may use RTU controller 26 to perform a series of actuations of RTU 11 stages to ascertain each stage's contribution to the overall current draw. Load baselining manager 47 may be executed periodically, i.e., once per week at some time of day where it would not necessarily interrupt a customer's operations.

To conduct measurements, load baselining manager 47 may perform the following steps. 1) Load baselining manager 47 may instruct repeater manager 45 to interrupt the repeating of packets between RTU 11 and supervisory controller 27. 2) Repeater manager 45 may begin "spoofing" the supervisor controller 27 by replying to commands from supervisory controller 27 intended for RTU controller 26. This act may be to avoid spurious communications loss alarms. 3) Load baselining manager 47 may send a series of commands to RTU controller 26 over an RS-485 port instructing controller 26 to enable each cooling stage of RTU 11 in sequence and measure the current draw after each stage has been engaged. The cooling stages may then be shut down in an orderly fashion. 4) If RTU 11 has an electric coil 22 for heating, load baselining manager 47 may send a series of commands to RTU controller 26 over the RS-485 port instructing it to enable each heating stage in sequence and measure the current draw after each stage has been engaged. The heating stages may then be shut down in an orderly fashion. 5) Load baselining manager 47 may send a command to RTU controller 26 over the RS-485 port instructing it to turn on its fan output. After the fan has engaged, it may measure the current draw and then send a command to RTU 11 to turn the fan off.

Load disaggregation 48 may be a software module which determines per-load energy consumption from the single current measurements of RTU 11. Load disaggregation 48 may employ the measurements made by the load baselining manager 47 in combination with the current state of RTU controller's stage outputs to determine each load's contribution to the total current draw.

A data logger 49 may be a software mechanism for storage of time series data. Data logger 49 may be used to store energy use measurements/calculations and data points/sensor readings from the RTU 11 and supervisory controllers 27. FDD and efficiency monitoring algorithms 46 may use data logger 49 as their data source.

Software or application level perspective 40 shows connections revealing information, data and signals among some of the modules, components, and the like. Current sensor 35 may provide total watts information to load baselining manager 47 and load disaggregation 48 along lines 52 and 53, respectively. Vibration sensor 36 may provide vibration data to FDD and efficiency monitoring algorithms 46 along line 54. One or more components of symbol 51 may provide RTU data points to load disaggregation 48 and data logger 49 along lines 55 and 56, respectively. FDD and efficiency monitoring algorithms 46 may provide alerts and reports to powerline comms 37 and to one or more components in symbol 51 along lines 57 and 58, respectively. Load baselining manager 47 may provide load actuations along line 59 to one or more components in symbol 51 and load watts along line 61 to load disaggregation 48. Load disaggregation 48 may provide energy use per load along line 62 to data logger 49. Data logger 49 may provide RTU data and energy use along line 63 to FDD and efficiency monitoring algorithms 46.

Figure 5:
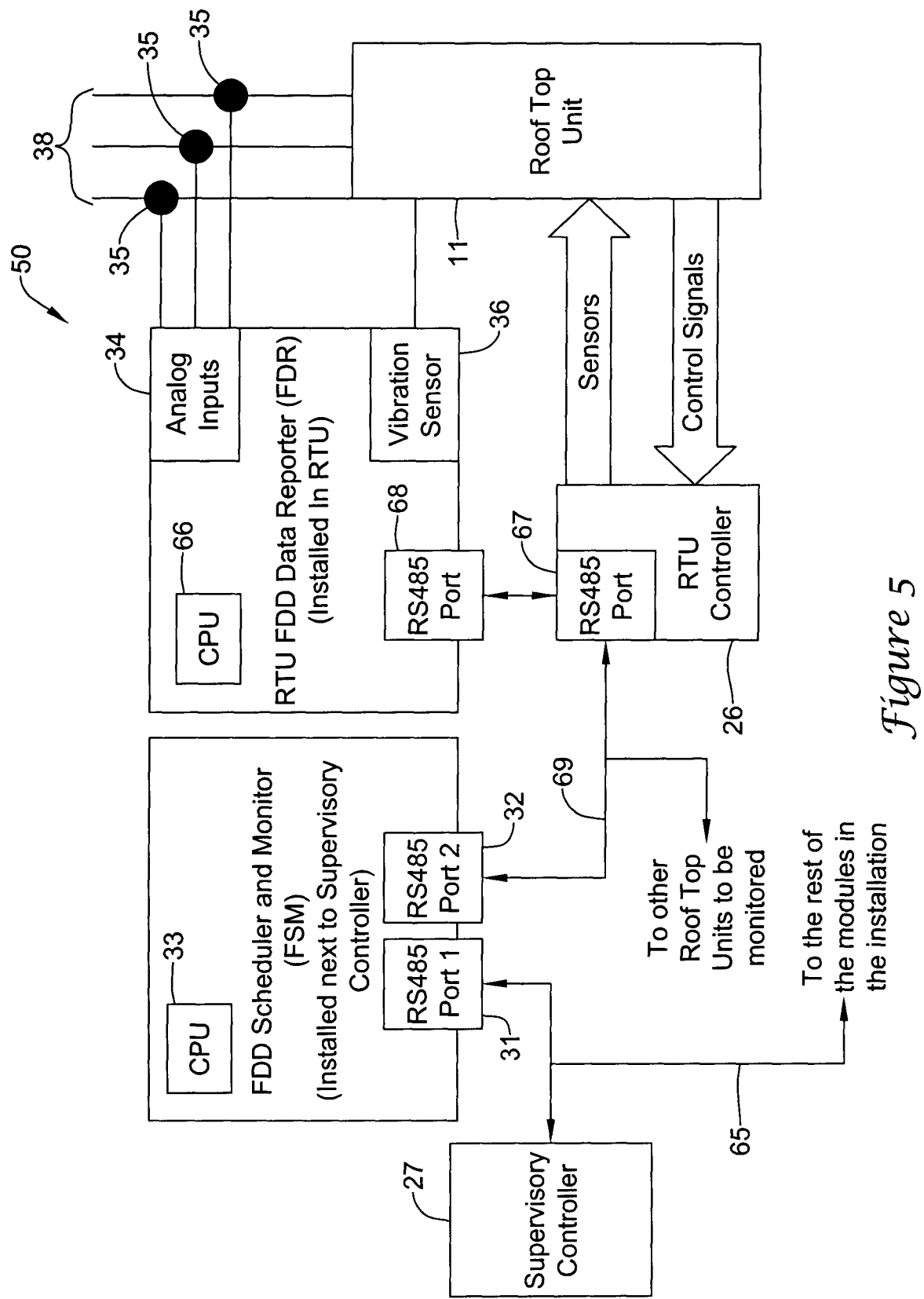
FIG. 5 is a diagram of an alternate approach to the system of FIG. 3.

FIG. 5 provides a diagram of an alternate approach 50 to power line comms 37 of FIG. 3, which may utilize the existing RS-485 wiring and reduce the cost and complexity of the multiple data gathering devices needed for each RTU 11 (FDR). Similar to the receiving end of the power line comms solution, a device installed next to the supervisory controller 27 may perform the data logging, scheduling, repeater managing and other high resource utilization functions. This may place the burden of cost in a single device per installation. A description of the items in FIG. 5 may be noted in the following. Supervisory controller 27, in most BMS systems, may be a centralized controller employed for occupancy scheduling, data collection, alarm collection and global data inputs, i.e. outside air temperature, humidity, and so forth. RS-485 ports 31 32, for instance, supervisory controller 27 may be connected to RTU controllers 26 with communications bus 28 (FIG. 2). Several different protocols may typically be used but the most common protocols in retail HVAC such as Novarnet™, BACnet™ MS/TP and Modbus™ tend to use an RS-485 physical layer with asynchronous character-based data transmission. RS-485 may be referenced in the present system but could be embodied with Lonworks or other bus types. A supervisory controller 27 may usually be the bus master in RS-485 protocols, and as such may initiate virtually all communication exchanges.

A FDD scheduler and monitor (FSM) CPU 33 may be reasonably priced 32-bit microcontroller with on-die support for serial ports. Possible candidates may include the Atmel™ 4S series or Freescale™ i.MX series. An embedded real time operating system may be also be employed for providing multithreading and other beneficial software functions.

Analog inputs 34 having analog-to-digital conversion channels may be employed for converting the raw output of current sensors 35 into a digital format. Current sensors 37 may be provided within a CPU for cost reasons. Analog inputs 34 may also be used for interfacing with vibration sensor 36.

An RTU FDD data reporter FDR CPU 66 may be a low cost 16-bit microcontroller preferably with on-die support for serial ports and analog inputs 34. It may be installed in RTU 11.

Vibration sensor 36 may be a reasonably priced triaxial accelerometer with an I2C™ digital interface. This may be employed to enable vibration analysis to be performed. Certain types of equipment degradation and malfunction may be characterized by changes in vibration patterns. The vibration sensor data may be used to support fault detection algorithms based on vibration analysis.

RTU controller 26 may be a dedicated embedded computing device for accomplishing digital staged heating and cooling control of a single packaged rooftop HVAC unit 11. A Novar™ electronic thermostat module (ETM) family controller may be used. The Novar™ ETM-2051, for example, may be commonly sold as a default factory accessory in certain commercial Lennox™ rooftop package units.

Roof top unit 11 may be a commercial roof-mounted HVAC device consisting of a vapor cycle compression cooling section 23, a gas or electric heating unit 22, a blower motor 13 and fan 12 for air circulation, dampers 18 and 19 for modulating outside air percentage and associated air filter or filters 21. (One may note FIG. 1.)

Current sensors 35 may be non-invasive clamp-on current sensors used to measure current draw on the 3 power phase feed 38 to RTU 11. Although clamp-on sensors may be typically more expensive than other current sensing devices, ease of installation in retrofits makes them worthwhile although the present system may use lower cost current sensors. Current sensor data may be collected by CPU 66 and/or CPU 33 via analog-to-digital conversion channels of analog inputs 34.

Bus or line 65 may be connected to supervisory controller 27, RS-485 port 31, and rest of the modules in the present system. Bus or line 69 may be connected to RS-485 port 32, RS-485 port 67 of RTU controller 26, RS-485 port 68, and other roof top units to be monitored.

Figure 6:
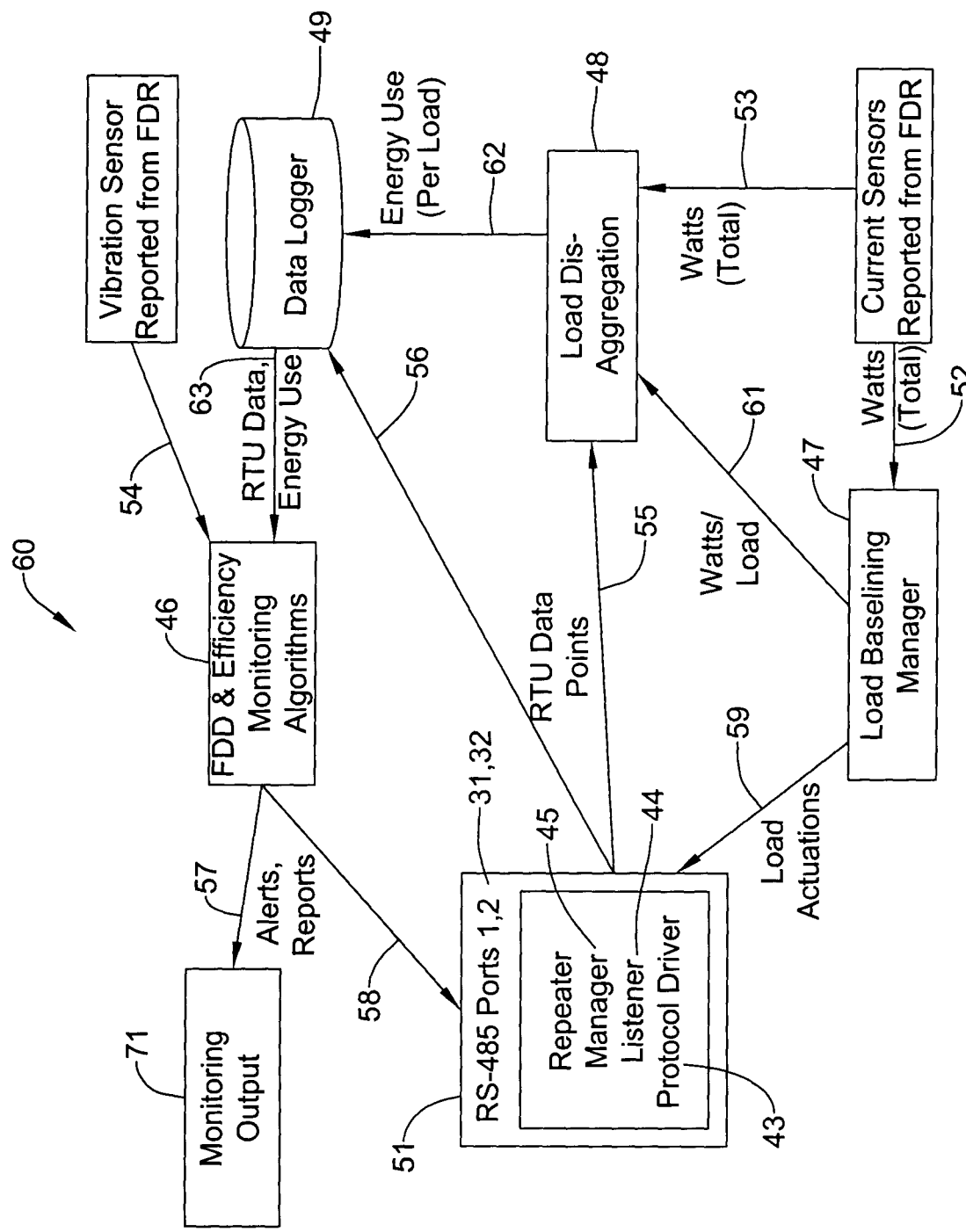
FIG. 6 is a diagram of a software or application level perspective that may appear as an alternative to the perspective of FIG. 4.

FIG. 6 is a diagram shows a software or application level perspective 60 of the present system. Perspective 60 may be regarded as an alternative to perspective 40 of FIG. 4, in that many of the functions appear to be performed in the FDD scheduler and monitor (FSM) and that data may be collected from RTU 11 by low cost FDD data reporters (FDRs).

Protocol driver 43 may contain a software driver for the building management system protocol used on the RS-485 communications bus. With the Novar Opus™ or LogicOne™ BMS, this may be a driver for the Novarnet™ protocol.

Listener 44 may be a software module that intercepts packets from the RTU controller 26 and the supervisory controller 27 in order to gather data points from each. The module may be used to obtain sensor readings from RTU controller 26 and global system values from the supervisory controller 27, such as outside temperature, humidity, and so forth.

Repeater manager 45 may be a software module that controls the information flow on the two RS-485 ports 31 and 32. The present system may employ two RS-485 ports to allow it to circumvent normal protocol operations when it needs to conduct private operations, i.e., load baselining with RTU controller 26. Port 31 may be wired to the supervisory controller 27 and port 32 may be wired to RTU controller 26. During normal operations, messages from supervisory controller 27 may be received on port 31 and repeated by the present system on port 32 unperturbed. Likewise, responses from the RTU controller 26 may be received on port 32 and are repeated up to supervisory controller 27. When the present system conducts load electrical load baseline measurements, the system may communicate directly with the RTU controller 26 on port 32 and mimic the normal communications responses of an RTU controller back to the supervisory controller 27 on port 31 so that spurious alarms are not necessarily caused in the BMS system.

FDD and efficiency monitoring algorithms 46 may be a collection of software algorithms used to detect equipment faults and operation inefficiencies in the heating, cooling and mechanical subsystems of RTU 11. A variety of algorithms based on mathematical models of predicted energy consumption may be employed. The algorithms may determine the ideal energy consumption for the current environmental conditions and control setpoints based on past historical measurements and compare measured energy consumption to the ideal energy consumption. Algorithms may be deployed for compressor fault detection, condenser fault detection, compressor refrigerant liquid slugging, overall control efficiency, performance degradation over time, mechanical fault detection, i.e., slipping belts and other common RTU faults. In addition to the energy model-based algorithms, other algorithms based on vibration analysis may be employed for detection of mechanical faults such as bearing wear. The present system may also provide a way for sending alerts and reports to an external entity, for example, a monitoring output module 71, for indicating the results of the FDD and efficiency monitoring algorithms 46. A provision may be made for allowing relevant parameters of the algorithms to be configured remotely over either an RS-485 bus or powerline comms 37.

An aspect of the present system may be able to deduce the energy consumption of the individual compressor motors, heating coil 22 and blower motor 13 from a single measured current draw. Load baselining manager 47 may use RTU controller 26 to perform a series of actuations of RTU stages to ascertain each stage's contribution to the overall current draw. Load baselining manager 47 may be executed periodically, i.e., once per week at some time of day where it would not necessarily interrupt a customer's operations. To conduct measurements, the load baselining manager may perform the following steps. 1) Instruct repeater manager 45 to interrupt the repeating of packets between RTU 11 and supervisory controller 27. 2) Repeater manager 45 may begin "spoofing" the supervisory controller 27 by replying to commands from supervisory controller 27 intended for RTU controller 26. This may be to avoid spurious communications loss alarms. 3) Load baselining manager 47 may send a series of commands to RTU controller 26 over an RS-485 port instructing it to enable each cooling stage in sequence and measure the current draw after each stage has engaged. The cooling stages may then be shut down in an orderly fashion.

4) If RTU 11 has an electric coil 22 for heating, load baselining manager may send a series of commands to RTU controller 26 over an RS-485 port instructing it to enable each heating stage in sequence and measure the current draw after each stage has engaged. The heating stages may then be shut down in an orderly fashion.

Load baselining manager 47 may send a command to RTU controller 26 over an RS-485 port instructing it to turn on its fan output. After the fan has engaged, it may measure the current draw and then send a command to RTU 11 to turn the fan off.

Load disaggregation 48 may be a software module which determines per-load energy consumption from single current measurements of RTU 11. It may employ measurements made by the load baselining manager 47 in combination with a current state of RTU controller's stage outputs to determine each load's contribution to the total current draw.

Data logger 49 may be a software mechanism for storage of time series data. Data logger 49 may be used to store energy use measurements/calculations and data points/sensor readings from RTU controller 26 and supervisory controller 27. FDD and efficiency monitoring algorithms 46 may use data logger 49 as their data source.

The computing system may be contained in a weatherproof enclosure for mounting on the external case of the RTU or internally. In either case, it may be necessary to be in close proximity to the external three phase power input to the RTU for connection of the current sensors.

There may be a large number of commercial buildings (offices, retail stores, and so forth) that are very poorly submetered in terms of electricity. Very commonly only the main meter may be installed somewhere near the building main switchgear panel. On the other hand, there appears to be an increasing demand for detailed (i.e., a fine grain, individual equipment level) energy measurements that could enable a lot of desired functionalities. Namely, these submetered data may serve as a deep energy audits input. One may base simple fault detection and diagnostics algorithms on the data and/or the results may help in a demand response (or active demand) strategy design.

An obstacle for the wide spread of physical submeters may be the submeters' relatively high price, especially when the installation labor cost (including the required infrastructure adjustments) has to be added. Some virtual submetering approaches may strive to disaggregate the powers consumed by individual loads having only the measured data from the main meter.

The present approach may exploit the fact that a majority of commercial buildings are equipped with the building management system (BMS) or building automation system (BAS) that collects the data from sensors monitoring individual equipment (HVAC devices, lighting, and so on) and there may be some available contextual information (of varying quality) that may let one know what devices are beyond the measurement point and some of the basic features of the devices (e.g., nominal power, RTU tonnage, and so forth). A present algorithm may then be capable of disaggregating reliably (with sufficient accuracy) of virtually all devices within the commercial building based on these inputs.

One may build a library of electricity consumption models for practically all equipment types that may be encountered in the commercial buildings. Models may need to be of course robust and general enough so that they can be used for virtually all particular devices within one equipment class. Examples of classes may incorporate roof top units, lighting, chillers, air handling units, and the like. The generality can be achieved, e.g., via constructing additive models. It means that the generic model may incorporate terms that represent individual contributions from virtually all equipment subparts to the total device consumption (e.g., for cooling stage 1, cooling stage 2, and so on, if any more, in a roof top unit). The generic model then may be automatically adjusted to capture the actual hardware configuration. It appears significant to leave the humans out of the loop to maximize the business impact, because tools requiring complex configuration cannot usually achieve wide commercial spread. Having the library ready, one may proceed to commercial building virtual submetering (or load disaggregation). The contextual (wiring hierarchy, power consuming equipment information, . . . ) information may be exploited for picking up models from the library for all equipment which is beyond the main meter. An estimate of submetered power may be then obtained by estimating all of the model parameters having main meter data and successive partitioning of a big total model to individual sub-models. Here, one may exploit rich contextual information to help the optimizer to find a reasonable solution. The contextual information of varying quality may be input to the optimizer in form of constraints. The constraint optimization (usually a linear one can be sufficient) tools then should be used. Furthermore, the optimizer may be provided with the initial values of parameters derived from the typically available contextual information (nominal power, tonnage, and so forth). The contextual information may often be stored in some predefined form somewhere accessible from the outside (e.g., from an algorithm). This means that this information may be also obtained automatically. An actual disaggregation may be performed both ways, that is, in a batch mode (typical for enterprise or supervisory level application) or online mode (executive level controllers—embedded devices) using recursive versions of optimization algorithms.

First, the library containing the electricity consumption models may have to be built and ready. The library may have to include models for all typical equipment in commercial buildings (RTU, air handling unit (AHU), chiller, fan coil units, and so on). Then the algorithm may need an access to the source of contextual information from the particular commercial building which is to be virtually submetered. This information (wiring hierarchy, device type description, and the like) may be exploited when selecting proper models from library for every electricity consuming or consumption device beyond the main meter. Usually only main energy consumers may necessarily be taken into account and the rest (e.g., bulbs, computers and other office equipment which control/status signals that are not necessarily collected by BMS/BAS) may be considered as noise. Noise may be considered as individual components of less than 500 watts. However, individual components may be considered as noise at another wattage level or less. The big model for the whole building electricity consumption may be built from particular sub-models that are using the HVAC control signals and measurements (fan speed, cooling stage 1 percentage on, outdoor air temperature, setpoints, and so forth) as explanatory variables. Now, the optimization task may be automatically formulated using the contextual information as the input for the parameters' constraints (e.g., lower and upper bounds) and initial values setup. Other constraints, like the inequality one securing the positivity of individual devices' disaggregated consumptions may be added. The optimizer (e.g., constrained least squares) may then find a solution and produce an estimate for all coefficients of the big model. Individual disaggregated consumptions may be obtained by evaluating the sub-models for the HVAC data and estimated parameters from a previous step.

Virtual submetering for commercial buildings may be implemented. A common scenario may involve more than one electrical device beyond the measurement point (main or sub meter). The metering may apply to commercial buildings equipped with BMS. A goal may be to disaggregate and report the operation of individual electrical loads behind this point. A motivation may incorporate saving money on intrusive measurements (e.g., additional submeters, infrastructure, and labor) and still obtain reliable and useful reports on individual appliances. One may allow a simple FDD on the disaggregated data (run off the schedule), deep energy audits, and a demand response strategy design.

Needed inputs may incorporate contextual information and data points. Contextual information questions may concern what is exactly connected beyond the given meter, basic information about equipment type and applied control strategy (e.g., RTU fan maintains the constant static pressure in the ductwork, and so forth), what is critical for the model based approach which may involve wiring scheme, building ontology (BIM), DB naming convention, manual entry (wizard).

Data points may involve energy meter data (watts), available measurements associated with the identified equipment beyond the meter (control signals plus load influencing variables), e.g., RTU fan speed/staging control signal, RTU compressor speed/staging control signals.

Figure 7:
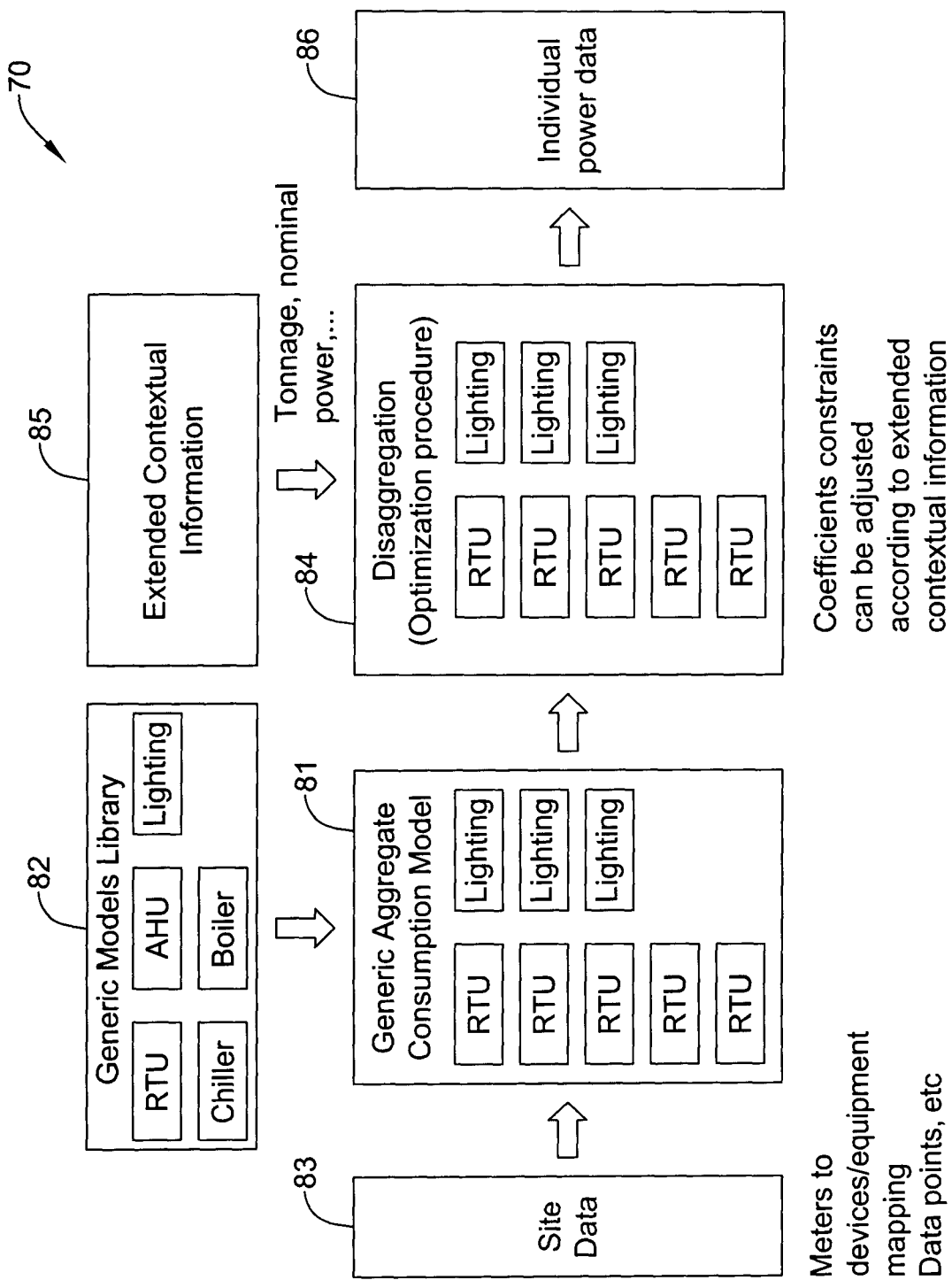
FIG. 7 is a diagram of an example layout for virtual submetering of commercial buildings.

An approach to virtual submetering for commercial buildings may be illustrated by a diagram 70 in FIG. 7. There may be a generic aggregate consumption model 81, with input from a generic models library 82. Site data 83 from meters to devices/equipment, mapping, e data points, and so forth, may be provided to the generic aggregate consumption model 81. Generic models library 82 may incorporate models of an RTU, AHU, lighting, chiller, boiler, and additional model of components as needed. Generic aggregate consumption model 81 may consider, for instance, five RTUs and three lighting systems, depending on the building being noted. An output may go to a block 84 where the RTUs and lighting system are subject to disaggregation in view of an optimization procedure. Extended contextual information 85, such as, for example, tonnage, nominal power, . . . , may be provided to block 84. Coefficient, constraints, may be adjusted according to extended contextual information. From block 84, individual power data 86 may be determined.

Figure 8:
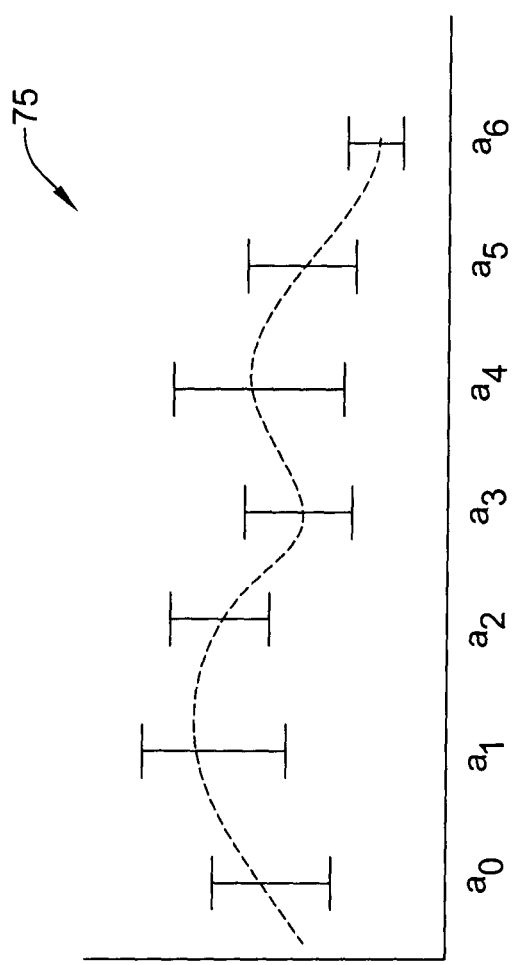
FIG. 8 is a diagram of a graph showing coefficients having various magnitude ranges and a profile of them.

Controlled (constrained) optimization may incorporate contextual information that provides useful inputs to the optimization procedure (disaggregation). The information may incorporate device class (RTU, AHU, chiller, . . . ) involving model structure, and device details (cooling tonnage, nominal power consumption, . . . ) involving coefficients, correlations, profile, constraints, and the like. One may note graph 75 FIG. 8. Without context information, equal devices from the same class might be assumed. When these guidelines are violated, there may be misleading results.

There may be a library of models. Examples may include fans, pumps, and so on. Control strategy may be to keep static ductwork pressure constant (typically satisfied).

Power=$f$(MassFlow)

Power=$a_0+a_1 \cdot Q+a_2 \cdot Q^2+a_3 \cdot Q^3$

Massflow might not typically be available. One may use fan/pump laws (Q~RPM~UVFD). This may not necessarily be accurate, as the laws may hold just for a fixed airflow/waterflow resistivity curve.

Power=$f$(ControlSignals)

Power=$a_0+a_1 \cdot U_{VFD}+a_2 \cdot U_{VFD}^2+a_2 \cdot U_{VFD}^3$

Example models for RTU energy consumption may be indicated by the following formulas.

Power=$a_1 \cdot$clg1$\cdot$OAT+$a_2 \cdot$clg2$\cdot$OAT+$a_3 \cdot$aoecon+ $a_4 \cdot$fango+$a_5 \cdot$htg1+$a_5 \cdot$htg2+$a_6 \cdot$(OAT−ZAT)+$a_7 \cdot$ (OAT−ZAT)$^2$.

This formula is just an example model for RTU consumption. OAT may represent outdoor air temperature; clg1/2 may represent a control signal for a cooling stage 1/2; fango may represent a control signal for a blower; htg1/2 may represent a control signal for a heating stage 1/2; aoecon may represent a control signal for an economizer; and ZAT (zone temp) may represent a substituted setpoint.

Figure 9:
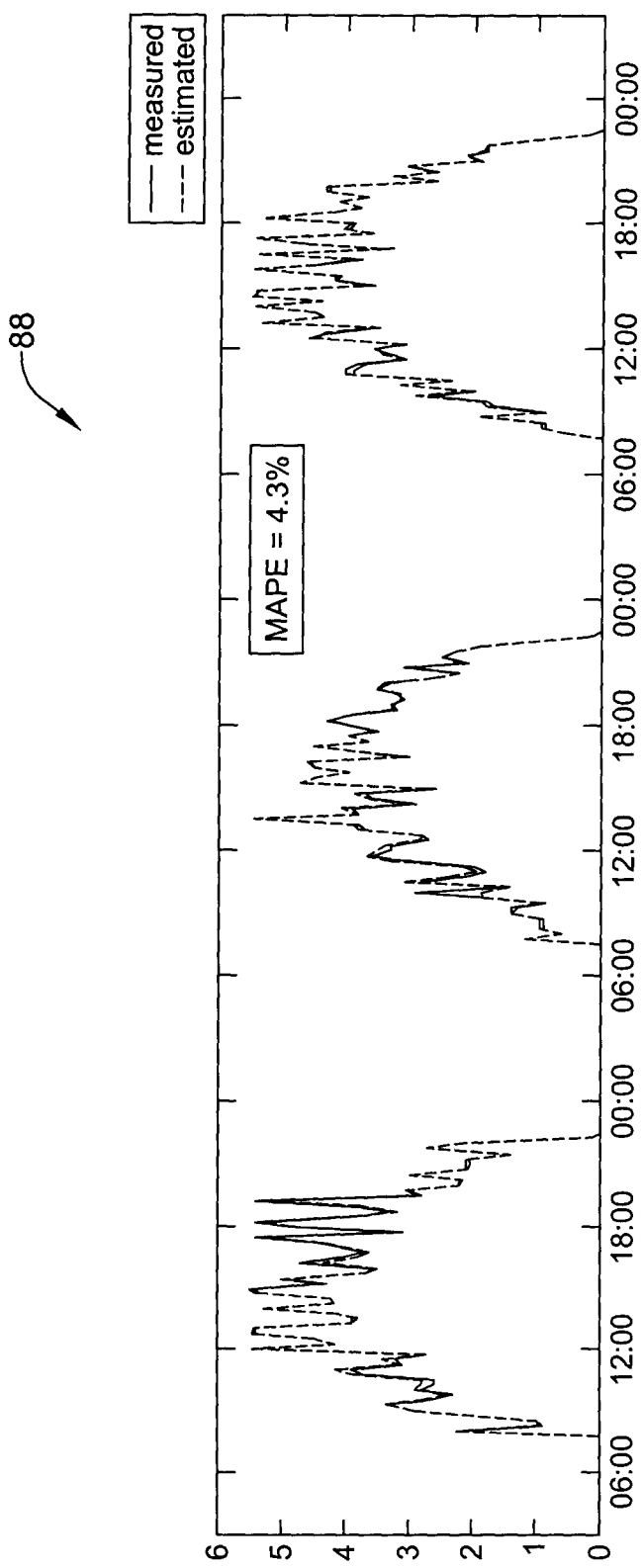
FIG. 9 is a diagram of a graph that reveals measured and estimated magnitudes of energy consumption versus time.
Figure 10A:
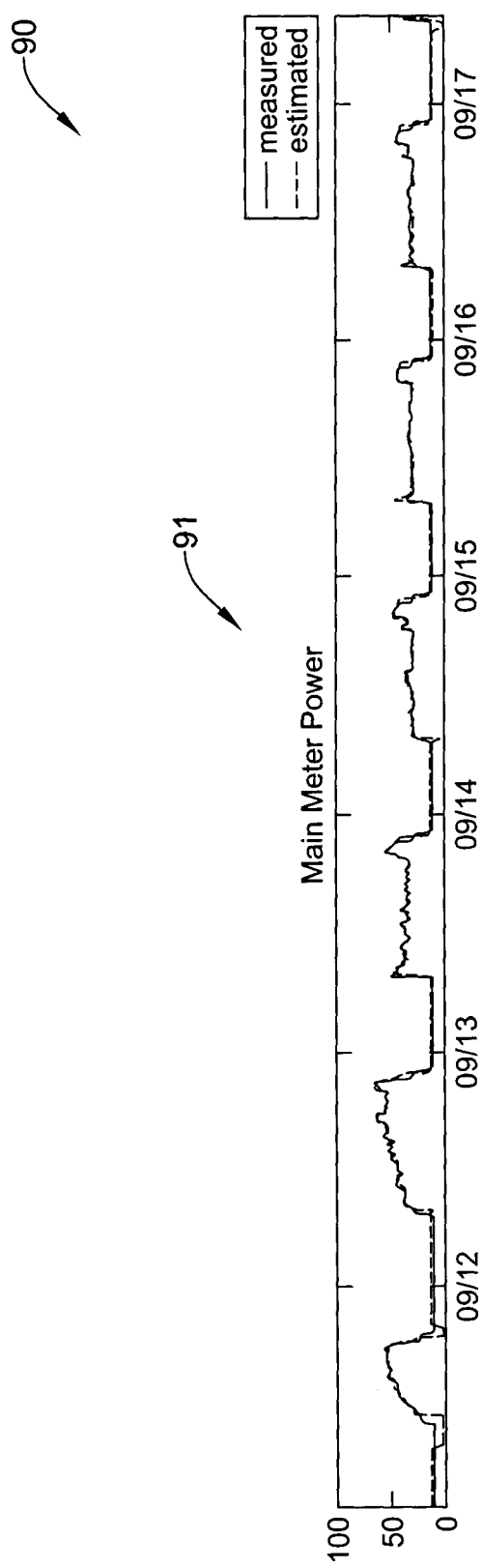
FIGS. 10A, 10B, 10C, 10D and 10E are diagrams of a graph showing an example of estimated disaggregated power consumption by roof top units at a retail store.
Figure 10B:
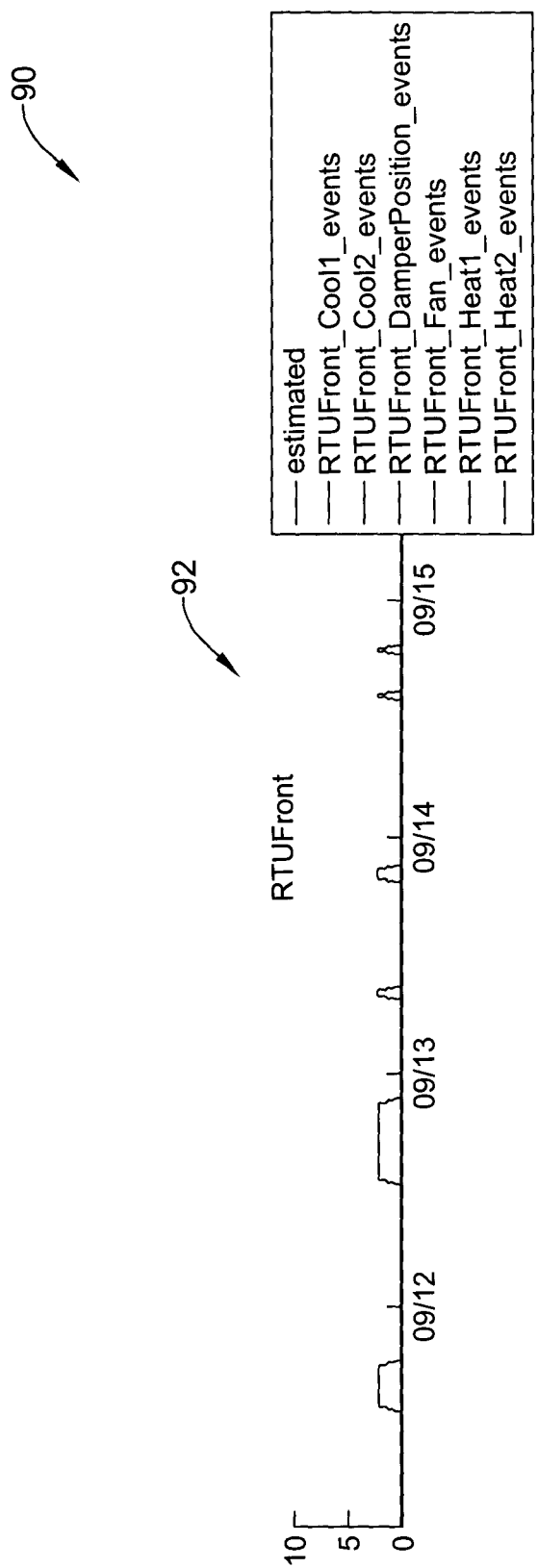
Figure 10C:
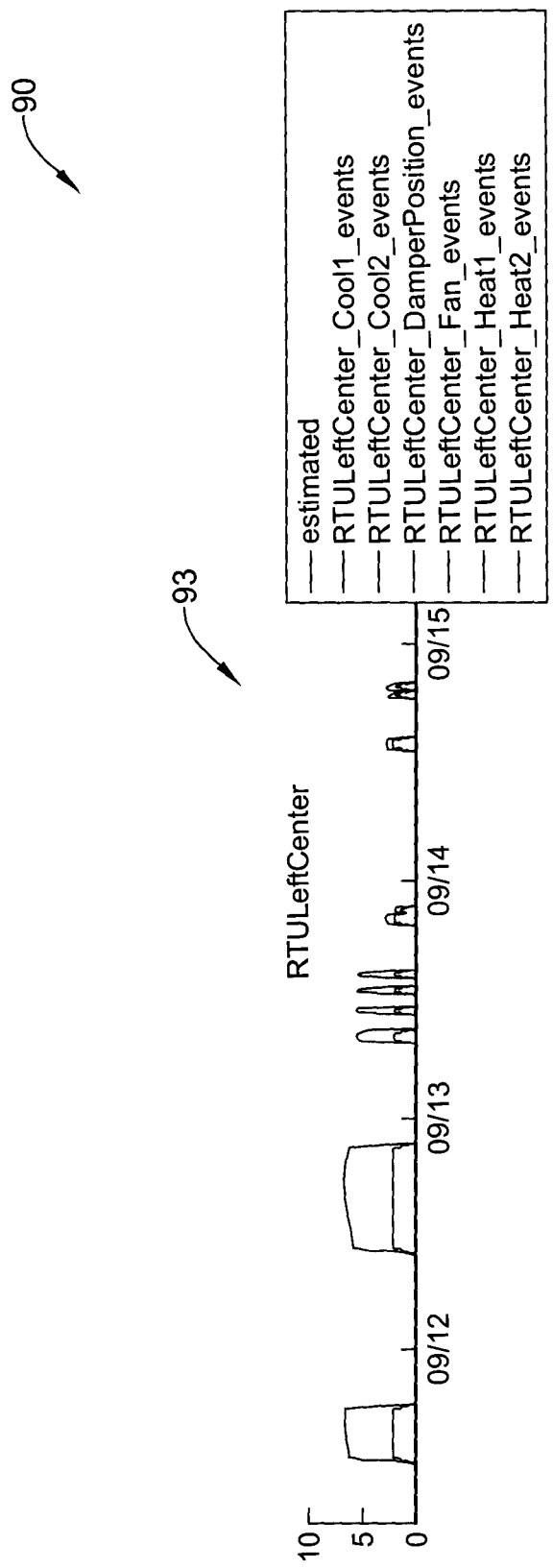
Figure 10D:
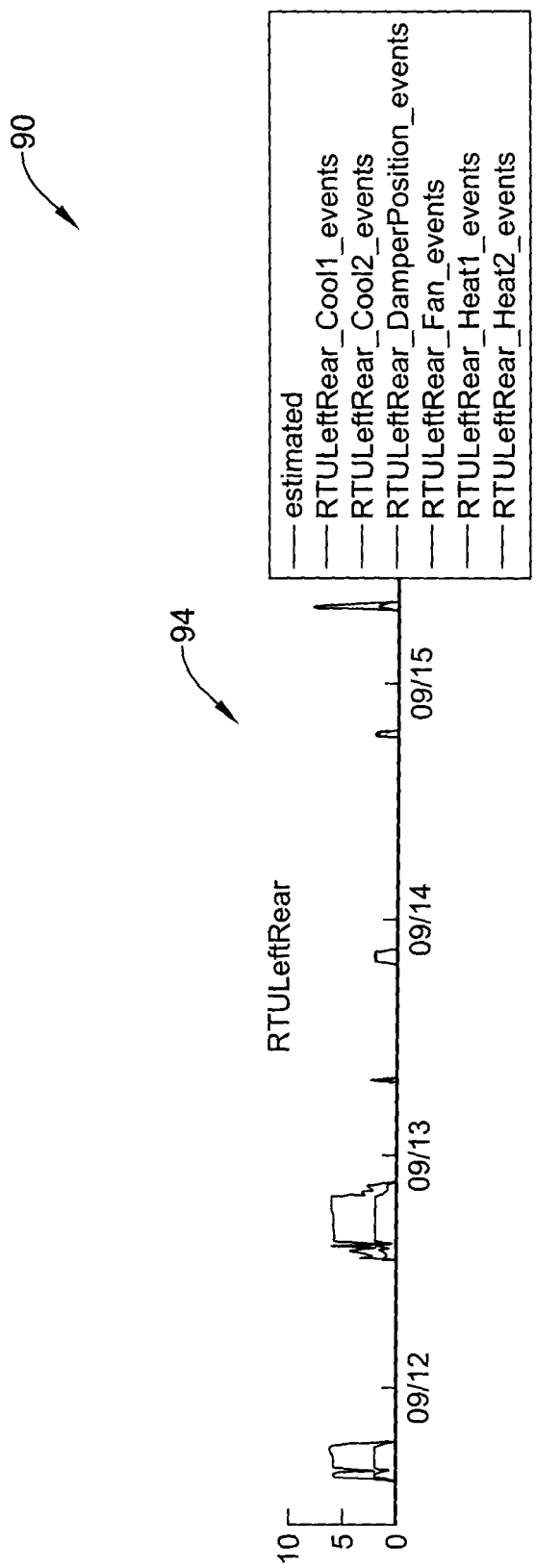
Figure 10E:
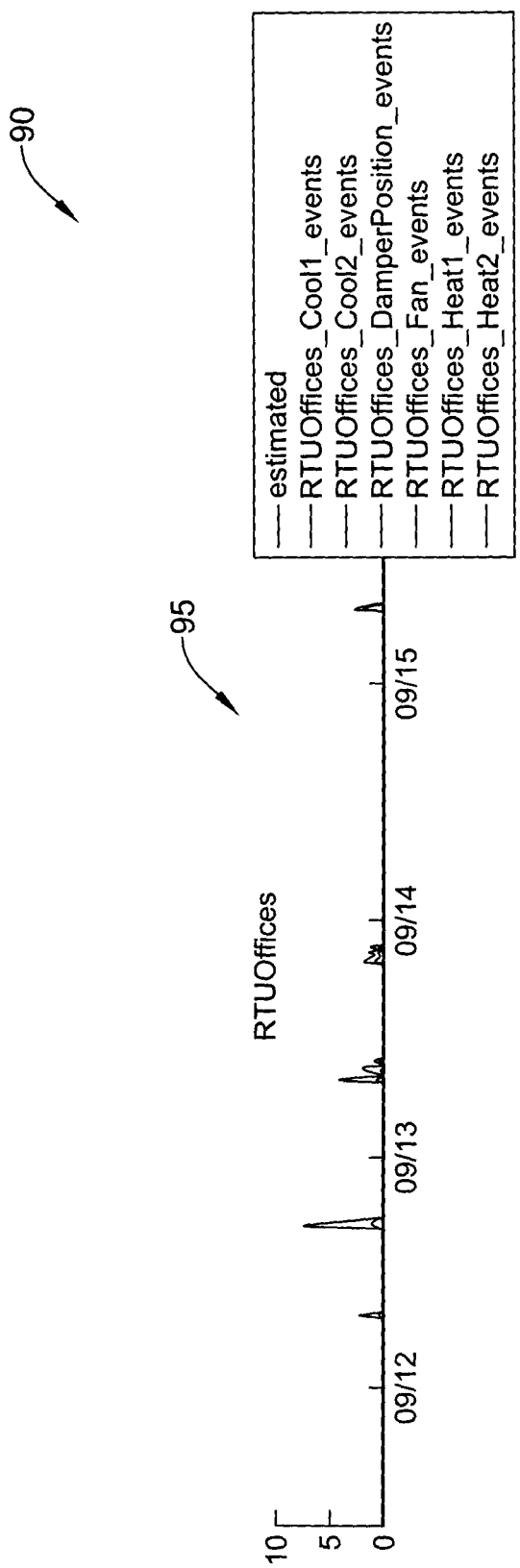

FIG. 9 is a diagram of a graph 88 that reveals measured and estimated information in terms of magnitude and time. The graph lines for the measurements and estimates appear very close.

Results of a retail store disaggregation of main measured power into power indications of components may be shown in FIGS. 10A, 10B, 10C, 10D and 10E having diagrams of a graph 90. Graph 90 illustrates estimated disaggregated consumption of RTUs at a retail store selected for review. Plots 92, 93, 94 and 95 show consumption for RTU front, RTU left center, RTU left rear and RTU offices, respectively. Plot 91 shows measured and estimated main meter power. The estimated power may be the sum of the plots 92-95 of the disaggregated measurements of the various RTUs. It may be noted that the estimated main meter power and the actual main meter power track each other rather closely in plot 91 which can imply that the disaggregated power indications of plots 92-95 may be considered fairly accurate.

To recap, a roof top unit fault detection and diagnostics appliance may incorporate a computer for connection to a roof top unit, a vibration sensor for attachment to a roof top unit and connected to the computer, and one or more current sensors for connection to a power feed to the roof top unit and connected to the computer. The vibration sensor may provide signals representing vibration at the roof top unit to the computer. The one or more current sensors may provide signals representing total power consumption by the roof top unit. The signals representing vibration and total power consumption may be analyzed to check for certain types of degradation and malfunction of the roof top unit.

The computer may incorporate a fault detection and diagnostic and efficiency monitoring algorithm module. The fault detection and diagnostic and efficiency monitoring algorithm module may detect equipment faults and/or operation inefficiencies in the heating, cooling and mechanical subsystems of the roof top unit.

The computer may further incorporate a load baselining manager that deduces energy consumption of individual components of the roof top unit.

The computer may further incorporate a load baselining manager that reduces energy consumption by individual components of the roof top unit by removing detected equipment faults and/or operation inefficiencies in the heating, cooling and mechanical subsystems of the roof top unit as indicated by the fault detection and diagnostic and efficiency monitoring algorithm module, based on signals representing vibration at the roof top unit, total power consumption by the roof top unit indicated by the one or more current sensors, and/or power consumption of each of one or more components indicated by a difference of readings of power consumption at the main meter caused by each of the respective components being turned on and off.

The computer may further incorporate a load disaggregation module that determines per-load energy consumptions from current data representing total power consumption by the roof top unit.

The fault detection and diagnostic and efficiency monitoring algorithm module may use differences in actual consumption of the equipment versus model-predicted consumption to detect potential issues with the roof top unit or a performance degradation of the roof top unit over a period of time.

The computer may further incorporate a data logger module that stores time series data from the vibration sensor and the one or more current sensors at a power feed to the roof top unit, for access and analysis by the fault detection and diagnostic and efficiency monitoring algorithm module.

With regard to the appliance, if the signals representing the vibration exhibit a pattern change, then the pattern change may be compared with known pattern changes representing certain types of degradation and malfunction of the roof top unit. If the pattern change matches a known pattern change, then the roof top unit may be considered to have a certain type of degradation or malfunction as represented by the known pattern change.

A virtual submetering system for a commercial building may incorporate a library of electrical power robust models representing virtually all types of equipment encountered in commercial buildings, and a set of generic device models in the library for achieving a generality for particular devices constituting a type of equipment so that a generic device model is developed to incorporate terms that lead to an electrical power consumption associated with a generic device model representing a device.

Virtual disaggregation of an electrical power load of a commercial building may be achieved with the library of electrical power robust models and the set of generic device models for virtually all types of equipment. Contextual information of the types of equipment may be exploited for selecting electrical power robust models from the library, representing virtually all types of equipment connected on an output end of a main meter having an input end for connection to an electrical power feed, the main meter indicating actual total electrical power consumption by the commercial building. An estimate of a disaggregation of an electrical power load of the commercial building may then be obtained by estimating parameters for virtually all models of devices receiving electrical power, from a total electrical power consumption indicated at the main meter and a successive partitioning of the total electrical power consumption of the devices represented by the models, to electrical power consumption by each device.

The optional contextual information of varying quality and/or degree may be input into an optimizer in a form of constraints. The optimizer may be provided with initial values and expected ranges of the parameters derived from available contextual information. An optimization task may be further adjusted according to contextual information available.

Disintegration of a commercial building load may be performed using recursive versions of an algorithm of the optimizer.

Disintegration of a commercial building load may be performed in a batch mode or in an online mode.

Parameters may incorporate at least one or more of supply and return air temperatures, outside air temperature, humidity, supply and return chilled water temperatures, control signals, operating schedules, energy consumption of equipment, and other points used for electricity consumption modeling.

Contextual information may incorporate mandatory contextual information and optional contextual information. The mandatory contextual information may incorporate devices, and type and class of devices connected beyond a measurement point that can be derived from a building ontology, wiring hierarchy data or wiring schemes, and data from a measurement point. The optional contextual information may incorporate one or more items such as that of power consuming equipment information, nominal power consumption, cooling tonnage, control strategy, and other like information. A manual entry of the optional contextual information may be enabled from a wizard.

A system, for virtual submetering power consumption by a building, may incorporate a library of electricity consumption models, and an algorithm which accesses contextual information of devices of a building being virtually submetered. Disaggregation of power consumption by the building relative to electricity consumption devices may be achieved by using the library of electricity consumption models and contextual information. Electricity consumption models may represent electricity consumption devices in buildings. The contextual information may be exploited when electricity consumption models are selected from the library, that represent virtually every electricity consumption device connected at an output end of a main electrical meter for the building, and the main electrical meter having an input end for connection to a power feed.

Contextual information may incorporate one or more items such as that of nominal power requirements, tonnage, device type, wiring hierarchy, building ontology, model structure, device class, data points, electricity consumption, specs, and other information about an electricity consumption device represented by an electricity consumption model. The contextual information pertaining to an electricity consumption model may be updated upon receipt of information about a device that is represented by the electricity consumption model.

Electricity consumption of a device may be indicated by a difference of readings of power consumption at the main electrical meter caused by one device at a time being turned on or off. Having only one device being turned on or off at once may be achieved by a system controller that triggers a training control sequence at a time when a customer operation cannot necessarily be corrupted. The training control sequence may substantially help an optimizer to quickly and accurately identify individual system sub-parts electricity consumption models.

Electricity consumption models for virtually all electricity consumption devices in the system may be accessed from the library of electricity consumption models. Electricity consumption for each electricity consumption model, if available, may be obtained from the contextual information pertaining to the electricity consumption models representing the electricity consumption devices of the system. Individual electricity consumptions may be obtained by a model identification process performed by an optimizer.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A fault detection and diagnostics device for a heating, ventilation, and air conditioning (HVAC) system, the device comprising:
   a current sensor configured to obtain energy use data of a component of the HVAC system;
   a vibration sensor configured to obtain vibration data of the component of the HVAC system; and
   a controller operatively coupled to the current sensor and the vibration sensor and configured to receive the energy use data and an overall current draw from the current sensor to create a predictive energy consumption model for the component of the HVAC system, partition the predictive energy consumption model into a set of predictive energy submodels for sub-parts of the component, compare the set of predictive energy consumption submodels to actual energy consumed by the subparts of the component, and derive a performance degradation for the subparts of the component based on the comparison between the set of predictive energy consumption submodels and the actual energy consumed; and
   wherein the controller is further configured to obtain environmental condition data, control setpoints of the component based on past historical measurements, and wherein the performance degradation for the subparts of the component are further based on the environmental condition data and the control setpoints of the component.

2. The device of claim 1, further comprising analog inputs for analog to digital conversion of the energy use data and the vibration data.

3. The device of claim 1, wherein the vibration data indicates degradation of the subparts of the component and malfunctions of the subparts are characterized by changes in patterns of the vibration data.

4. The device of claim 1, wherein the vibration sensor comprises a triaxial accelerometer.

5. The device of claim 1, wherein the energy use data indicates a current drawn by the subparts of the component.

6. The device of claim 1, wherein the current sensor comprises a clamp-on sensor.

7. The device of claim 1, wherein the controller is further configured to obtain environmental condition data, control setpoints of the component based on past historical measurements, and wherein the performance degradation for the subparts of the component are further based on the environmental condition data and the control setpoints of the component.

8. A fault detection and diagnostics system comprising:
   a heating, ventilation, and air conditioning (HVAC) system;
   a current sensor configured to obtain energy use data of a component of the HVAC system;
   a vibration sensor configured to obtain vibration data of the component of the HVAC system; and
   a controller operatively coupled to the current sensor and the vibration sensor and configured to receive the energy use data and an overall current draw from the current sensor to create a predictive energy consumption model for the component of the HVAC system, partition the predictive energy consumption model into a set of predictive energy submodels for sub-parts of the component, compare the set of predictive energy consumption submodels to actual energy consumed by the subparts of the component, and derive a performance degradation for the subparts of the component based on the comparison between the set of predictive energy consumption submodels and the actual energy consumed; and
   wherein the controller is further configured to obtain environmental condition data, control setpoints of the component based on past historical measurements, and wherein the performance degradation for the sub-parts of the component are further based on the environmental condition data and the control setpoints of the component.

9. The system of claim 8, further comprising analog inputs for analog to digital conversion of the energy use data and the vibration data.

10. The system of claim 8, wherein the vibration data indicates degradation of the subparts of the component and malfunctions of the subparts are characterized by changes in patterns of the vibration data.

11. The system of claim 8, wherein the vibration sensor comprises a triaxial accelerometer.

12. The system of claim 8, wherein the energy use data indicates a current drawn by the subparts of the component.

13. The system of claim 8, wherein the current sensor comprises a clamp-on sensor.

14. A method of detecting and diagnosing faults for a heating, ventilation, and air conditioning (HVAC) system, the method comprising:
   obtaining energy use data of a component of the HVAC system using a current sensor;
   obtaining vibration data of the component of the HVAC system using a vibration sensor; and using a controller operatively coupled to the current sensor and the vibration sensor:
   receive the energy use data and an overall current draw from the current sensor;
   create a predictive energy consumption model for the component of the HVAC system; and
   partition the predictive energy consumption model into a set of predictive energy submodels for subparts of the component;
   compare the set of predictive energy consumption submodels to actual energy consumed by the subparts of the component;
   derive a performance degradation for the subparts of the component based on the comparison between the set of predictive energy consumption sub-models and the actual energy consumed;

obtaining environmental condition data; and controlling setpoints of the component based on past historical measurements; and wherein the performance degradation for the subparts of the component is further based on the environmental condition data and the control setpoints of the component.

15. The method of claim 14, wherein the vibration data indicates degradation of the subparts of the component and malfunctions of the subparts are characterized by changes in patterns of the vibration data.

16. The method of claim 14, wherein the vibration sensor comprises a triaxial accelerometer.

17. The method of claim 14, wherein the energy use data indicates a current drawn by the subparts of the component.

18. The method of claim 14, wherein the current sensor comprises a clamp-on sensor.

* * * * *